(12) United States Patent
Adachi (10) Patent No.: US 8,953,230 B2
(45) Date of Patent: Feb. 10, 2015

(54) IMAGE READING APPARATUS AND IMAGE FORMING APPARATUS

(71) Applicant: Canon Kabushiki Kaisha, Tokyo (JP)

(72) Inventor: Seiichiro Adachi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/896,615

(22) Filed: May 17, 2013

(65) Prior Publication Data

US 2013/0321885 A1 Dec. 5, 2013

(30) Foreign Application Priority Data

May 31, 2012 (JP) ................................. 2012-124456

(51) Int. Cl.
| | |
|---|---|
| H04N 1/04 | (2006.01) |
| G03G 15/00 | (2006.01) |
| B65H 5/00 | (2006.01) |
| B65H 1/00 | (2006.01) |
| H04N 1/00 | (2006.01) |
| H04N 1/203 | (2006.01) |
| H04N 1/12 | (2006.01) |

(52) U.S. Cl.
CPC .... H04N 1/00588 (2013.01); H04N 2201/0091 (2013.01); H04N 1/0066 (2013.01); H04N 1/2032 (2013.01); H04N 1/12 (2013.01); H04N 1/00631 (2013.01); H04N 1/00628 (2013.01); H04N 1/00793 (2013.01); H04N 1/0062 (2013.01)

USPC ........... 358/498; 358/496; 358/497; 399/367; 271/10.01; 271/162; 271/264

(58) Field of Classification Search
USPC ......... 358/498; 271/10.01, 162, 264; 399/367
See application file for complete search history.

(56) References Cited

U.S. PATENT DOCUMENTS

| | | | |
|---|---|---|---|
| 5,546,168 A | 8/1996 | Adachi et al. | |
| 5,700,002 A | 12/1997 | Kato et al. | |
| 6,276,677 B1 | 8/2001 | Hommochi et al. | |
| 7,419,152 B2 | 9/2008 | Adachi | |
| 7,878,497 B2 | 2/2011 | Adachi | |
| 2004/0240916 A1* | 12/2004 | Takata et al. ................. | 399/367 |

FOREIGN PATENT DOCUMENTS

JP 2000-118744 A 4/2000

* cited by examiner

*Primary Examiner* — Charlotte M Baker
*Assistant Examiner* — Rury Grisham
(74) *Attorney, Agent, or Firm* — Fitzpatrick, Cella, Harper & Scinto (57) ABSTRACT

An image reading apparatus is provided with a registration roller configured such that a downstream end in a sheet feeding direction of a sheet abut to correct a skew of the sheet, and a pulling roller that conveys the sheet to the registration roller. The pulling roller is disposed such that a center of an arrangement in a direction orthogonal to the sheet feeding direction of the pulling roller is located on a side of the first restricting plate from a widthwise center of the sheet conveying path.

19 Claims, 8 Drawing Sheets

IMAGE READING APPARATUS AND IMAGE FORMING APPARATUS

BACKGROUND OF THE INVENTION

1. Field of the Invention

The present invention relates to an image reading apparatus configured to read an image and to an image forming apparatus including such image reading apparatus.

2. Description of the Related Art

Various image forming apparatuses such as a copier and a facsimile are provided with an image reading apparatus configured to read an image in general. Some image reading apparatuses also include an automatic document feeder (abbreviated as "ADF" hereinafter) configured to feed a sheet such as a document sheet stacked on a stacking portion to an image reading portion. Such image reading apparatus including the ADF adopts a method of reading the image while feeding the sheet stacked on the stacking portion by the ADF to the image reading portion at a constant speed (referred to as "skimming-through" hereinafter).

By the way, there is a case of skimming through different sizes of sheets mixedly stacked on the stacking portion. However, because the different sizes of sheets have different sizes also in terms of a width of the sheet in a direction orthogonal to a sheet feeding direction (referred to simply as a "sheet width" or "widthwise" hereinafter), a position of a center (midpoint) of the sheet width is different per different size of sheet. Therefore, there is a case when the sheets are fed while being skewed, as rollers that feed and separate the sheets come in contact with parts of the sheets other than the center thereof in skimming through the mixedly stacked different sizes of sheets. When the sheets are fed askew to the image reading portion, there is a possibility that an image is read aslant by the image reading portion.

Then, Japanese Patent Application Laid-open No. 2000-118744 discloses an image reading apparatus configured to skim through different sizes of sheets mixedly stacked on a stacking portion such that a feed roller for feeding a sheet comes in contact with a widthwise center of the sheet of the small sheet.

Specifically, this image reading apparatus is provided with the feed roller movable in a direction orthogonal to the sheet feeding direction. That is, the feed roller is moved widthwise in skimming through the sheets mixedly stacked on a document tray, i.e., the stacking portion, so that the feed roller comes into contact with the widthwise center of the small sheet to suppress its skew. Meanwhile, the large sheet is skimmed through while suppressing its skew by restricting the sheet widthwise by a restricting plate.

Thus, the sheet is fed askew unless the feed roller is moved such that the feed roller comes in contact with the center of the sheet width of the small sheet in skimming through the different sizes of sheets stacked mixedly on the document tray in the image reading apparatus disclosed in Japanese Patent Application Laid-open No. 2000-118744. Then, in order to prevent the skew, an operator (user) has to move the feed roller by himself/herself every time in changing sizes of the sheets, and the apparatus has to be halted to move the feed roller every time when the feed roller is moved. Thus, it has been time-consuming and cumbersome to carry out such operation.

SUMMARY OF THE INVENTION

According to a first aspect of the invention, there is provided an image reading apparatus including an image reading portion configured to read an image formed on a sheet, a stacking portion configured to stack the sheet from which the image is to be read by the image reading portion, a first restricting portion disposed in the stacking portion and configured to restrict a first end in a widthwise direction orthogonal to a sheet feeding direction of all sheets having different sizes and mixedly stacked on the stacking portion, a second restricting portion disposed to face the first restricting portion and configured to restrict a second end in the widthwise direction of a sheet having a widest width among the sheets mixedly stacked on the stacking portion, a separating and feeding portion configured to feed the sheets stacked on the stacking portion one by one to a sheet conveying path, a skew correcting portion provided on a downstream of the separating and feeding portion in the sheet feeding direction and configured such that a downstream end in the sheet feeding direction of the sheet abuts to correct a skew of the sheet, and to feed the sheet whose skew has been corrected to the image reading portion and a sheet conveying portion provided between the separating and feeding portion and the skew correcting portion and configured to convey the sheet such that the downstream end of the sheet abuts against the skew correcting portion, the sheet conveying portion being disposed such that a center of conveyance of the sheet conveying portion is located on a side of the first restricting portion from a widthwise center of the sheet conveying path.

According to a second aspect of the invention, there is provided an image reading apparatus including a sheet tray configured to stack sheets, a first restricting plate configured to restrict a first end in a direction orthogonal to a sheet feeding direction of all sheets having different sizes and mixedly stacked on the sheet tray, a second restricting plate configured to restrict a second end on an opposite side from the first end of a sheet having a widest width among the sheets mixedly stacked on the sheet tray, a skew correcting roller configured such that a downstream end in the sheet feeding direction of the sheet fed from the sheet tray to the sheet conveying path abuts, and to rotate to feed the sheet to an image reading position and a conveying roller located on an upstream of the skew correcting roller in the sheet feeding direction to convey the sheet such that the sheet abuts against the skew correcting roller, the conveying roller being disposed such that a center of conveyance of the conveying roller is located on the side of the first restricting plate widthwise from a center of conveyance of the skew correcting roller.

Further features of the present invention will become apparent from the following description of exemplary embodiments with reference to the attached drawings.

DESCRIPTION OF THE EMBODIMENTS

First Embodiment

Figure 1:
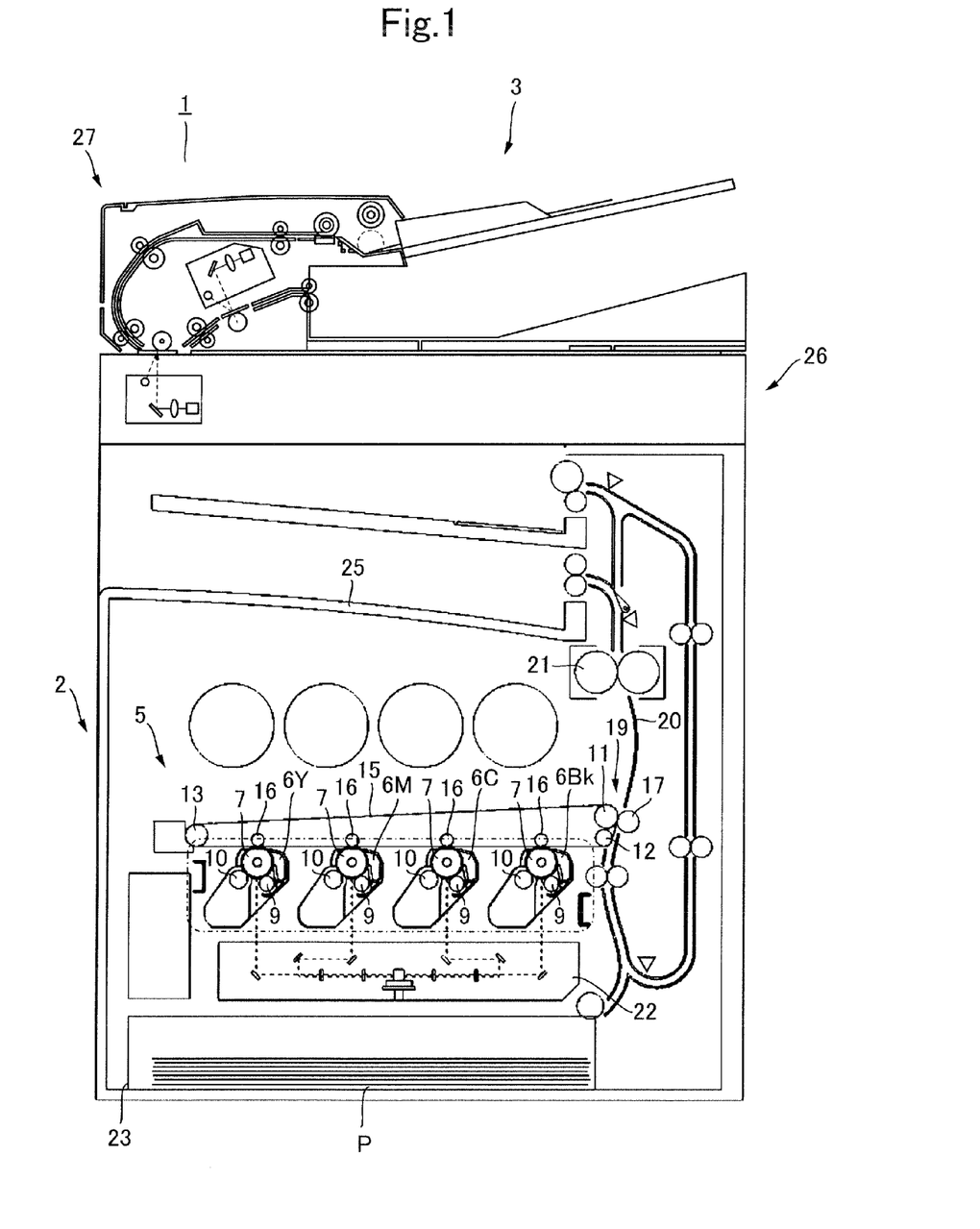
FIG. 1 is a section view schematically illustrating a structure of an image forming apparatus including an image reading apparatus of a first embodiment of the invention.

An image reading apparatus of an embodiment of the invention will now be described with reference to FIGS. 1 through 7. FIG. 1 shows a digital color multi-function printer (referred to simply as a "copier" hereinafter) 1 which is an exemplary image forming apparatus including the image reading apparatus of the present embodiment. The copier 1 includes a copier body 2 in which an image forming portion 5 for forming an image is built and an image reading apparatus 3 disposed above the copier body 2 and configured to read an image of a document.

The image forming portion 5 is provided with four removable processing cartridges 6Y, 6Y, 6C and 6Bk storing yellow (Y), magenta (M), cyan (C), and black (Bk) toners for forming toner images. Each of the processing cartridges 6Y, 6Y, 6C and 6Bk is provided with a photoconductive drum 7, a charging roller 9, a developer 10, and others. Disposed above the respective processing cartridges 6Y, 6Y, 6C and 6Bk is an endless intermediate transfer belt 15 which is wrapped around a secondary transfer counterface roller 11, a drive roller 12, and a driven roller 13. The intermediate transfer belt 15 is nipped between a primary transfer roller 16, disposed so as to face the photoconductive drum 7, and the photoconductive drum 7.

A secondary transfer roller 17 is provided to face the secondary transfer counterface roller 11, and composes a secondary transfer portion 19 together with the secondary transfer counterface roller 11. The secondary transfer portion 19 is provided on a conveying path 20 for conveying a sheet P, and a fixing unit 21 for fixing an image is provided on the conveying path 20 downstream in the sheet feeding direction of the secondary transfer portion 19.

Provided under the processing cartridges 6Y, 6Y, 6C and 6Bk are an exposure unit 22 that irradiates laser light and a sheet feeding cassette 23 configured to be able to be drawn in a direction orthogonal to the sheet feeding direction.

Image forming operations of the copier 1 constructed as described above will now be briefly described. Image data read by the image reading apparatus 3 is translated into an electrical signal and is transmitted to the exposure unit 22. Based on the signal, the exposure unit 22 irradiates laser light to a surface of each of the photoconductive drums 7. The surfaces of the respective photoconductive drums 7 are sequentially exposed by the irradiation of the laser light.

Each developer 10 develops an electrostatic latent image by adhering negatively charged toner on the surface of each photoconductive drum 7. The electrostatic latent images are developed and visualized by the respective color toners of yellow, magenta, cyan, and black. A bias whose polarity is reversed from the toner charging polarity is applied to the primary transfer roller 16. Thereby, the toner images on the photoconductive drums 7 are sequentially superimposed and transferred onto the intermediate transfer belt 15.

A sheet P fed from the sheet feeding cassette 23 is sent to the secondary transfer portion 19 in synchronism with the toner image on the intermediate transfer belt 15. A bias whose polarity is reversed from the toner charging polarity is then applied to the secondary transfer roller 17 to transfer the toner image onto the sheet P in batch. The sheet P on which the toner image has been transferred is sent to the fixing unit 21 to fix the color image on the sheet P and is then discharged to a discharge tray 25.

Next, the image reading apparatus 3 provided above the copier body 2 will be described. As shown in FIG. 1, the image reading apparatus 3 includes a body 26 of the image reading apparatus (referred to simply as an "apparatus body" hereinafter) configured to read image information of an image to be formed in the image forming portion 5 as shown in FIG. 1 and an ADF (automatic document feeder) 27 that conveys (feeds) the sheet P to the apparatus body 26.

Figure 2:
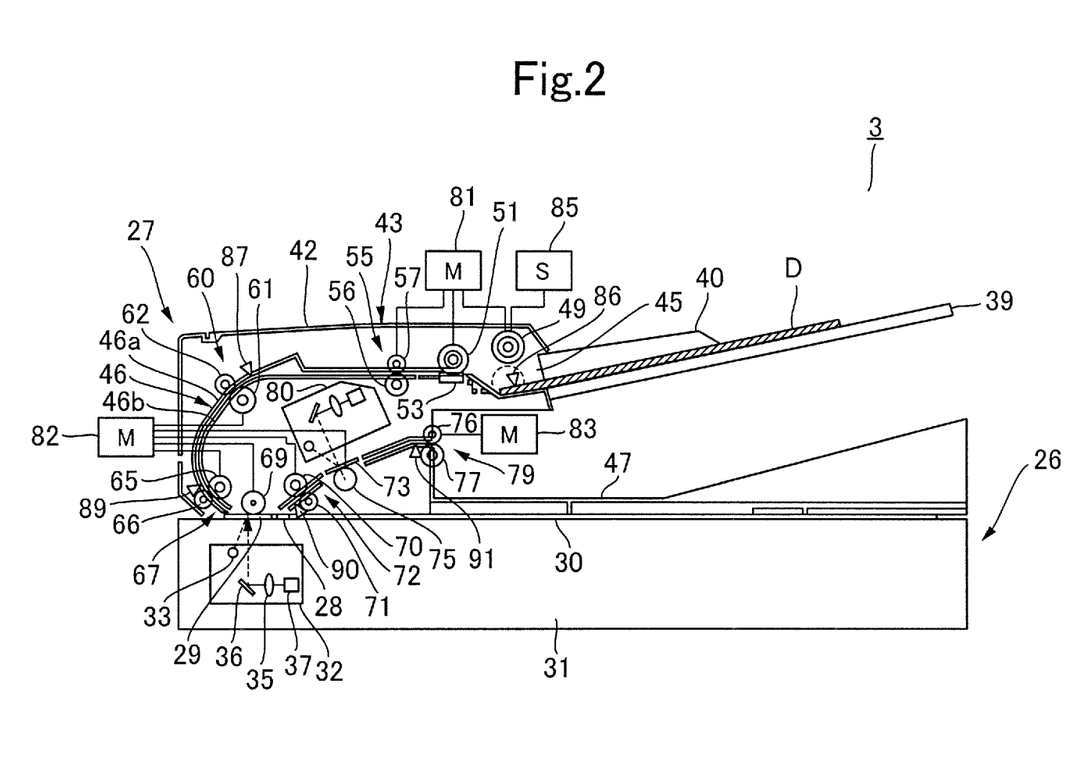
FIG. 2 is a section view schematically illustrating a structure of the image reading apparatus of the first embodiment.

As shown in FIG. 2, the apparatus body 26 is provided with a first platen glass 29 and a platen glass 30 on an upper surface thereof. A jump 28 that picks up a document D (sheet P on which an image has been formed) conveyed to the first platen glass 29 is provided between the first platen glass 29 and the platen glass 30. Provided under the platen glass 30 is an image reading portion (referred to as a "reader portion" hereinafter) 31 that is provided with an optical bench 32. The optical bench 32 has a lamp 33 that irradiates light to an image surface of the document D, a mirror 36 that guides reflection light of the lamp 33 reflected by the document D to a lens 35, a charge-coupled device (referred to as a "CCD" hereinafter) 37 as an image sensor, and others.

The optical bench 32 is coupled with an optical bench moving motor not shown through a wire not shown and is arranged to reciprocate in parallel with the platen glass 30 in conjunction with rotation of the optical bench moving motor. The optical bench moving motor consists of a stepping motor whose rotation is determined by a number of input pulses and is configured to reciprocate the optical bench 32 by normally/reversely rotating based on a position of a position sensor not shown that detects a home position of the optical bench 32.

The reader portion 31 is arranged to read the image of the document D by either mode selected by the operator (user) from a skimming-through mode (ADF document reading mode) or a stationary reading mode (platen glass document reading mode). The skimming-through mode is a mode of reading an image of a document by passing the document D fed from the ADF 27 on the first platen glass 29 (image reading position) provided above the standing optical bench 32. The stationary reading mode is a mode of reading an image of the document D placed on the platen glass 30 by the user by optically scanning the document by reciprocating the optical bench 32.

The ADF 27 is provided above the apparatus body 26 and is arranged to be openable/closable with respect to the reader portion 31 by a hinge not shown provided at its rear part. The ADF 27 is provided with a document tray (sheet tray) 39, i.e., a stacking portion, for stacking the document D. A first restricting plate 40, i.e., a first restricting portion, and a second restricting plate 41, i.e., a second restricting portion, which restrict a sheet in terms of a width direction orthogonal to the sheet feeding direction are provided respectively at both ends of the document tray 39 (see FIG. 4). The first and second restricting plates 40 and 41 are provided such that they face with each other and are movable in the direction orthogonal to the sheet feeding direction (referred to simply as an "orthogonal direction" or a "width direction" hereinafter).

A downstream side in the sheet feeding direction of the document tray 39 is fitted to a body portion 43 of the ADF 27 covered by a cover 42, and a feed opening 45 for feeding the document D on the document tray 39 to an inside of the body portion 43 is provided at the position where the document tray 39 is fitted to the body portion 43. A sheet conveying path 46 for conveying the document D fed from the feed opening 45 is also provided within the body portion 43. The sheet conveying path 46 is formed by such members as guide plates 46a and 46b disposed such that they face with each other, is curved substantially into a shape of U when viewed from a side, and is connected with a discharge tray 47 to which the document D whose image has been read is discharged.

A document supplying roller (sheet supplying roller) 49 constructed by one feed rotating member (roller member) that feeds the document D on the document tray 39 to the sheet conveying path 46 is provided at an upper part of a downstream side in the sheet feeding direction of the document tray 39 within the body portion 43. The document supplying roller 49 is supported integrally by a rotational shaft 50 extending in the orthogonal direction (see FIG. 4). The rotational shaft 50 is supported so as to be lifted/lowered by an arm not shown. The document supplying roller 49 is arranged such that it sets back upward to a position indicated by a solid line in FIG. 2 normally so that it does not contact with the document D, and such that it is lowered to a position indicated by a broken line in FIG. 2 and comes in contact with an upper surface of the document D in feeding the document D. It is noted that each roller is composed of one or a plurality of roller members in the following description.

An orthogonal (widthwise) center of the disposition (arrangement) of the document supplying roller 49 is located at a widthwise midpoint of the document supplying roller 49, and this widthwise center of the disposition of the roller 49 will be referred to as a 'center of conveyance' of the document supplying roller 49 hereinafter. The center of conveyance of the document supplying roller 49 is located on a straight line C1 shown in FIG. 4, and is located on a side of the first restricting plate 40 from a straight line C2 on which an orthogonal center of the sheet conveying path 46 is located. The orthogonal center of the sheet conveying path 46 is an orthogonal center of a largest-size sheet that can be conveyed by the ADF 27. The orthogonal center of the sheet conveying path 46 is an midpoint position between the first and second restricting plates 40 and 41 in the present embodiment. An orthogonal center of a part of the document tray 39 for stacking the document D is provided such that it is located on the straight line C2 equally with the orthogonal center of the sheet conveying path 46 (referred to simply as a "widthwise center of the sheet conveying path 46" hereinafter). The first and second restricting plates 40 and 41 move widthwise while keeping the condition in which a distance from the first restricting plate 40 to the midpoint of the sheet conveying path 46 (the widthwise center of the sheet conveying path 46) is equal to a distance from the second restricting plate 41 to the midpoint of the sheet conveying path 46. In a case that a bunch of documents D whose widthwise size is consistent and which are not mixedly is stacked on the document tray 39, one end of the bunch of documents D is restricted by the first restricting plates 40 and other end of the bunch of documents D is restricted by the second restricting plates 41.

Here, a "center of conveyance" of a roller is a center of an arrangement (allay) of the roller member (or the roller members) in the direction orthogonal to the sheet feeding direction in conveying a sheet P, and is a position by which each roller can feed (convey) the sheet P in a balanced manner without causing skew when the widthwise center (midpoint) of the sheet is aligned with the center of conveyance of the rollers. For instance, because the document supplying roller 49 is composed of one roller member, the center of conveyance of the document supplying roller 49 is the position of the widthwise center (midpoint) of the one roller member. In a case of a roller composed of two identical roller members arrayed in a row along a rotational shaft for example, a position of a midpoint between the two roller members is the center of conveyance of the roller. The same applies also to centers of conveyance of a separating and conveying roller 51, a pulling roller 56, and a registration roller (skew correcting roller) 61 described later.

The separating and conveying roller 51 that separates and conveys the document D and a pulling roller pair 55 that pulls the document D out of the separating and conveying roller 51 and conveys the document D are provided along the sheet conveying path 46 sequentially toward the downstream side of the sheet feeding direction (referred to simply as a "downstream side" hereinafter). A registration roller pair 60 that corrects a skew of the document D conveyed askew is also provided on the downstream side of the pulling roller pair 55 as shown in FIG. 2.

The separating and conveying roller 51, i.e., feed rotating member (feed roller member), is supported integrally by a rotational shaft 52, and a separation pad 53 is provided so as to face the separating and conveying roller 51. The separating pad 53 is in pressure-contact with the separating and conveying roller 51 and is composed of a frictional member such as rubber whose friction is slightly smaller than that of the separating and conveying roller 51. Thus, the separating pad 53 and the separating and conveying roller 51 form a nip portion for separating and conveying the document D. The center of conveyance of the separating and conveying roller 51 is located at a widthwise center (midpoint) of the one feed rotating member (separating and conveying roller 51), and is located on the straight line C1 similarly to the center of conveyance of the document supplying roller 49 and on the side of the first restricting plate 40 from the straight line C2 (see FIG. 4). It is noted that the document supplying roller 49, the separating and conveying roller 51 and the separating pad 53 compose a separating and feeding portion.

The pulling roller pair 55 is composed of a pulling roller 56 and a pulling driven roller 57 that is rotated following the pulling roller 56. The pulling roller pair 55 composes a sheet conveying portion. The pulling roller 56 includes three large and small roller members 56a, 56b and 56c, i.e., conveying rotating members, arrayed widthwise such that the roller members 56a through 56v orient in the sheet feeding direction and supported together by the rotational shaft 59. The identical small roller members, i.e., the third and second conveying roller members, 56a and 56c are arrayed at both ends of the roller such that they interpose the large roller member (first conveying roller member) 56b at equal intervals (see FIG. 4). The center of conveyance of the pulling roller 56 having the three roller members 56a, 56b and 56c is located at a widthwise center (midpoint) of the large roller member 56b and also on the side of the first restricting plate 40 from the straight line C2 in the same manner with the document supplying roller 49 and the separating and conveying roller 51. Thus, the centers of conveyance of the document supplying roller 49, the separating and conveying roller 51, and the pulling roller 56 are provided such that they are aligned respectively on the same straight line in the sheet feeding direction (see FIG. 4). That is, the center of conveyance of the document supplying roller 49, the center of conveyance of the separating and conveying roller 51, and the center of conveyance of the pulling roller 56 are aligned with each other on the straight line C1 in the sheet feeding direction.

The registration roller pair 60 is composed of a registration roller 61 and a registration driven roller 62 that rotates following the rotation of the registration roller 61. The registration roller pair 60 composes a registration portion (skew correcting portion). The registration roller 61 includes two identical roller members (second and first registration roller members) 61a and 61b arrayed widthwise such that the roller members 61a and 61b orient in the sheet feeding direction and and supported together by the rotational shaft 63. The center of conveyance of the registration roller 61 is located at a midpoint between the two roller members 61a and 61b such that the registration roller 61 conveys each sheet of a bunch of documents D whose widthwise size is consistent and which are not mixedly stacked without skew in skimming through each document D. That is, the center of conveyance of the registration roller 61 is located on the straight line C2 which is the widthwise center of the sheet conveying path 46 (see FIG. 4). Thus, the centers of conveyance of the document supplying roller 49, the separating and conveying roller 51, and the pulling roller 56 are offset respectively toward the first restricting plate 40 side with respect to the center of conveyance of the registration roller 61. It is noted that the roller member (third conveying roller member) 56a disposed orthogonally on the side of the second restricting plate 41 from the center roller member (first conveying roller member) 56b among the roller members 56a, 56b and 56c of the pulling roller 56 is disposed on the side of the first restricting plate 40 orthogonally from the (second registration) roller member 61a of the registration roller 61 disposed on the side of the second restricting plate 41.

Provided along the sheet conveying path 46 on a downstream side of the registration roller pair 60 are a first read roller pair 67 composed of a first read roller 65 and a first read driven roller 66, and an upstream platen roller 69 disposed on the first platen glass 29 so as to face the first platen glass 29. A second read roller pair 72 composed of a second read roller 70 and a second read driven roller 71, and a downstream platen roller 75 disposed under the second platen glass 73 so as to face the second platen glass 73 are provided on a downstream side of the upstream platen roller 69. A discharge roller pair 79 composed of a discharge roller 76 and a discharge driven roller 77 is provided also on a downstream side of the downstream platen roller 75. Still further, as shown in FIG. 2, a back surface reading unit 80 configured to read a back surface of the document D whose surface image has been read is provided above the second platen glass 73.

Figure 3:
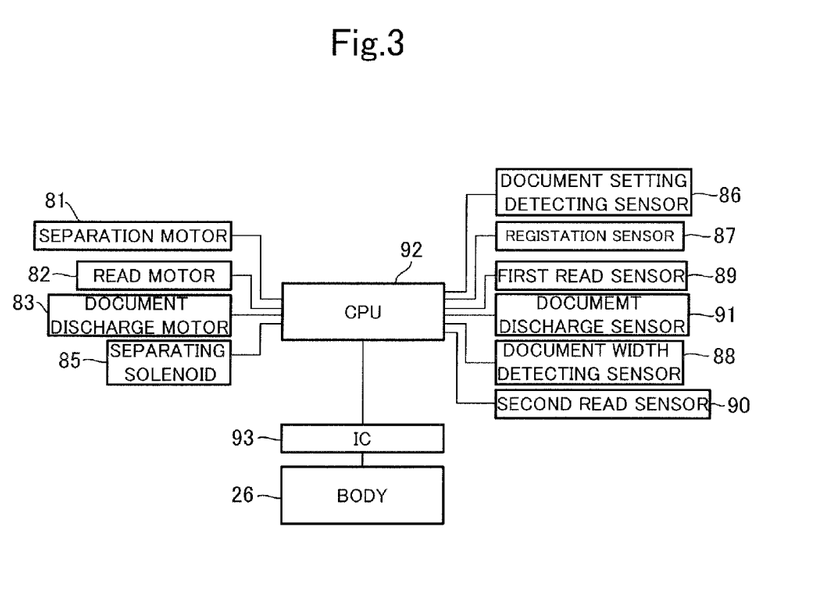
FIG. 3 is a block diagram of a control mechanism of the image reading apparatus of the first embodiment.

As shown in FIG. 3, the respective rollers and roller pairs described above are arranged to be rotationally driven respectively by a separating motor 81, a read motor 82, and a document discharge motor 83. It is noted that the separating motor 81, the read motor 82, and the document discharge motor 83 consist of stepping motors, respectively, similarly to the optical bench moving motor described above.

Then, as shown in FIG. 2, the document supplying roller 49, the separating and conveying roller 51, and the pulling roller 56 are driven by the separating motor 81, and the discharge roller 76 is driven by the document discharge motor 83. The registration roller 61, the first read roller 65, the second read roller 70, the upstream platen roller 69, and the downstream platen roller 75 are driven by the read motor 82.

The liftable document supplying roller 49 is arranged to be lifted/lowered by a separation solenoid 85. A separating solenoid 85 includes a keep solenoid that keeps the document supplying roller 49 at a position not hampering the document D in stacking the document D on the document tray 39.

As shown in FIG. 2, a document setting detecting sensor 86 constructed by a transmission type optical sensor and detecting that the document D is stacked on the document tray 39 is provided on a downstream side in the sheet feeding direction of the document tray 39. A document width detecting sensor 88 that detects a widthwise dimension of the document D stacked on the document tray 39 by detecting positions of the first and second restricting plates 40 and 41 is also provided under the document tray 39 (see FIG. 3).

A plurality of sensors is provided also within the body portion 43 of the ADF 27. That is, a registration sensor 87 that controls an abutment (an amount of loop) of the document D against the registration roller pair 60 by detecting an edge of the document D is provided on an upstream side in the sheet feeding direction (referred to simply as an "upstream side" hereinafter) of the registration driven roller 62 along the sheet conveying path 46. The registration sensor 87 is constructed by a transmission type optical sensor similarly to the document setting detecting sensor 86.

A first read sensor 89 that detects position of the document D by detecting a downstream end of the document D and that transmits a signal for counting a timing for starting to read an image in the reader portion 31 is provided on an upstream side of the first read driven roller 66. Differing from the document setting detecting sensor 86 and the registration sensor 87, the first read sensor 89 is constructed by a reflection type optical sensor. A second read sensor 90 that detects the position of the document D by detecting the downstream end of the document D and that transmits a signal for counting a timing for starting to read an image by the back surface reading unit 80 is also provided on an upstream side of the second read driven roller 71. A document discharge sensor 91 that detects a document discharging timing is provided on an upstream side of the discharge driven roller 77. The second read sensor 90 is constructed by a reflection type optical sensor, and the document discharge sensor 91 is constructed by a transmission type optical sensor, respectively.

The ADF 27 has a control portion consisted of a central processing unit (referred to as a "CPU" hereinafter) 92. The control portion includes a RAM backed up by a battery not shown, and a ROM in which control sequence programs are stored. The CPU 92 is connected with a CPU not shown of the apparatus body 26 through an integrated circuit (IC) 93.

The CPU 92 is connected also with the separating motor 81, the read motor 82, the document discharge motor 83 and the separating solenoid 85. Each motor is driven by each stepping motor driver, into which phase excitation signals and motor current signals are input from the CPU 92. The separating solenoid 85 is configured to be driven by a driver such that operations thereof are controlled based on signals from the CPU 92.

The various sensors such as the document setting detecting sensor 86, the registration sensor 87, the first read sensor 89, the document discharge sensor 91, the document width detecting sensor 88, and the second read sensor 90 are connected to input ports of the CPU 92. Based on signals from these sensors, behaviors of the document D and the movable portions of the apparatus are monitored.

Figure 4:
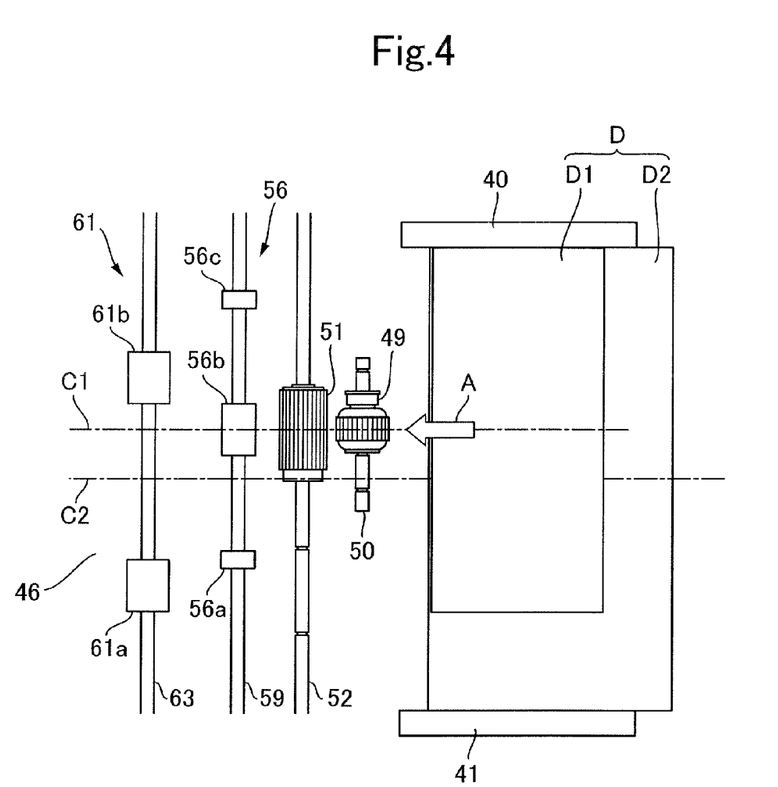
FIG. 4 is a diagram showing an arrangement of various rollers in a case when a widthwise center of a small sheet among sheets mixedly stacked on a document tray is aligned with a center of conveyance of a pulling roller in an ADF of the first embodiment.

Image reading operations of the image reading apparatus 3 constructed as described above will now be described with reference to FIGS. 4 through 7. In skimming through the documents D whose sheet width sizes are different, i.e., the document D1 whose sheet width is narrow and the document D2 whose sheet width is wide (referred to as a "different-width sheet mixed-stacking mode" hereinafter), the operator stacks the documents on the document tray 39 by abutting one widthwise end of the documents D1 and D2 against the first restricting plate 40 as shown in FIG. 4. An indication urging the operator to stack the documents on the document tray 39 by abutting one end of all of the documents against the first restricting plate 40 may be displayed on a display not shown in executing the different-width sheet mixed-stacking mode for example. At this time, while both widthwise ends of the document D2 are restricted by the first and second restricting plates 40 and 41, the other end of the document D1 is stacked in a free condition by being away from the second restricting plate 41. A widthwise center (midpoint) of the document D2 is aligned with the straight line C2 which is the widthwise center of the sheet conveying path 46, and a widthwise center of the document D1 is aligned with the straight line C1 which is the center of conveyance of the pulling roller 56 and others.

Along with a control for starting to read the documents made by the operator after stacking the documents D1 and D2, the document setting detecting sensor 86 detects whether or not the document D is stacked on the document tray 39. When it is detected that the document D is stacked on the tray, the document width detecting sensor 88 detects dimensions of the document D. After detecting the dimensions of the document, an operation for reading the document D is started.

That is, when the operation for reading the document is started, the separating solenoid 85 releases a retaining force that retains the document supplying roller 49 to lower the document supplying roller 49 such that the document supplying roller 49 comes in press-contact with an uppermost document D1 on the document tray 39. After that, the document supplying roller 49 feeds the documents D1 and D2 in a direction of an arrow A indicated in FIG. 4 to a gap between the separating and conveying roller 51 and the separating pad 53.

When a plurality of documents D1 is sent in a condition in which the documents D1 overlap with each other (multi-feed condition), the separating and conveying roller 51 and the separating pad 53 separate the documents D1 one by one by, and the separating and conveying roller 51 conveys the separated document D1 to the nip of the pulling roller pair 55. It is noted that the separating and conveying roller 51 includes a one-way clutch not shown, and when the document D1 is conveyed by the pulling roller pair 55, the drive of the separating and conveying roller 51 is released and the roller 51 rotates together with the document D1 to be conveyed by the pulling roller pair 55.

It is noted that the centers of conveyance of the pulling roller 56, the separating and conveying roller 51 and the document supplying roller 49 are located at the position offset to the first restricting plate 40 side with respect to the widthwise center of the large document D2 as described above. Due to that, although a rotational moment that rotates the document D2 counterclockwise is generated in the document D2 in feeding and separating the document D2, the document D2 is suppressed from skewing because the both ends of the document D2 are restricted by the first and second restricting plates 40 and 41.

Figure 5:
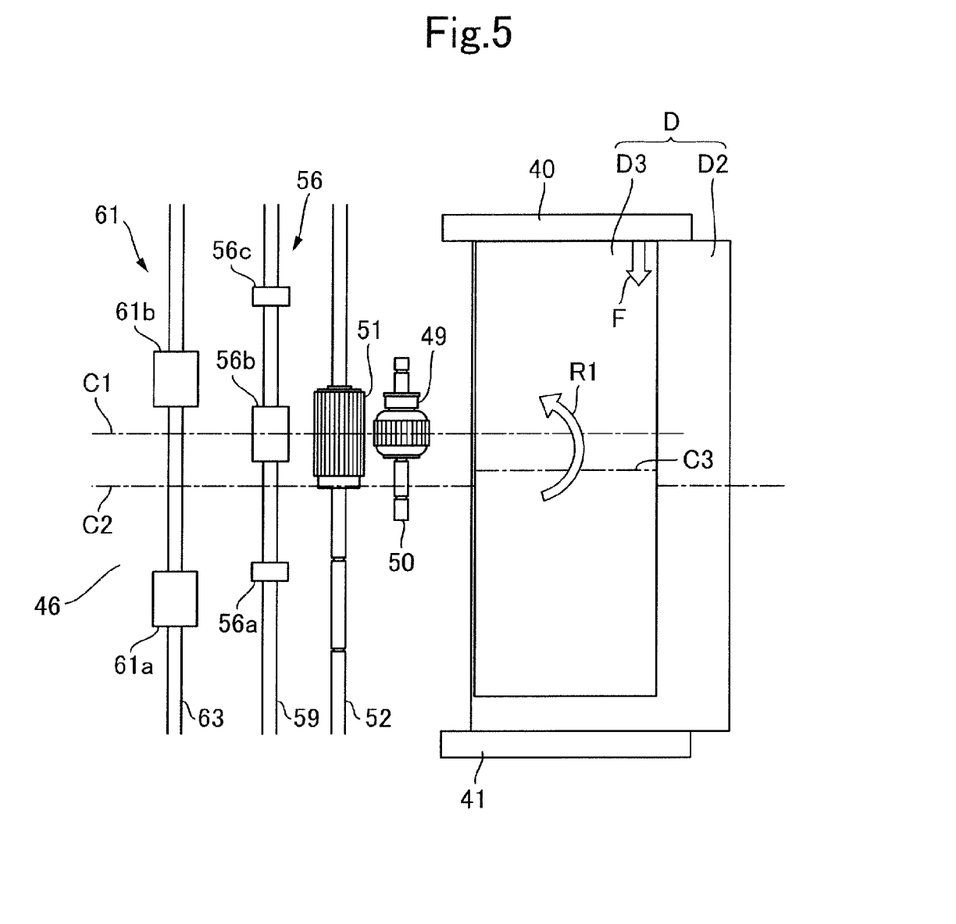
FIG. 5 is a diagram showing an arrangement of the various rollers when a widthwise center of a small sheet among sheets mixedly stacked on the document tray is located on a side of a second restricting plate from the center of conveyance of the pulling roller in the ADF of the first embodiment.

It is also possible to feed and convey the document D1 without causing skew because no moment is generated in separating and feeding the document D1 when the widthwise center of the document D1 is aligned with the center of conveyance of the pulling roller 56, the separating and conveying roller 51 and others as shown in FIG. 4. When a widthwise center C3 of a stacked document D3 is located on the side of the second restricting plate 41 from the straight line C1 on which the center of conveyance of the pulling roller 56 and others is located as shown in FIG. 5, a rotational moment that rotates the document counterclockwise (as indicated by an arrow R1) is generated in the document D3 in feeding and separating the document D3. However, because one end of the document D3 is restricted by the first restricting plate 40, the rotation of the document D3 caused by the rotational moment is restricted by the first restricting plate 40, and the document D3 is fed and separated without skew.

Figure 6:
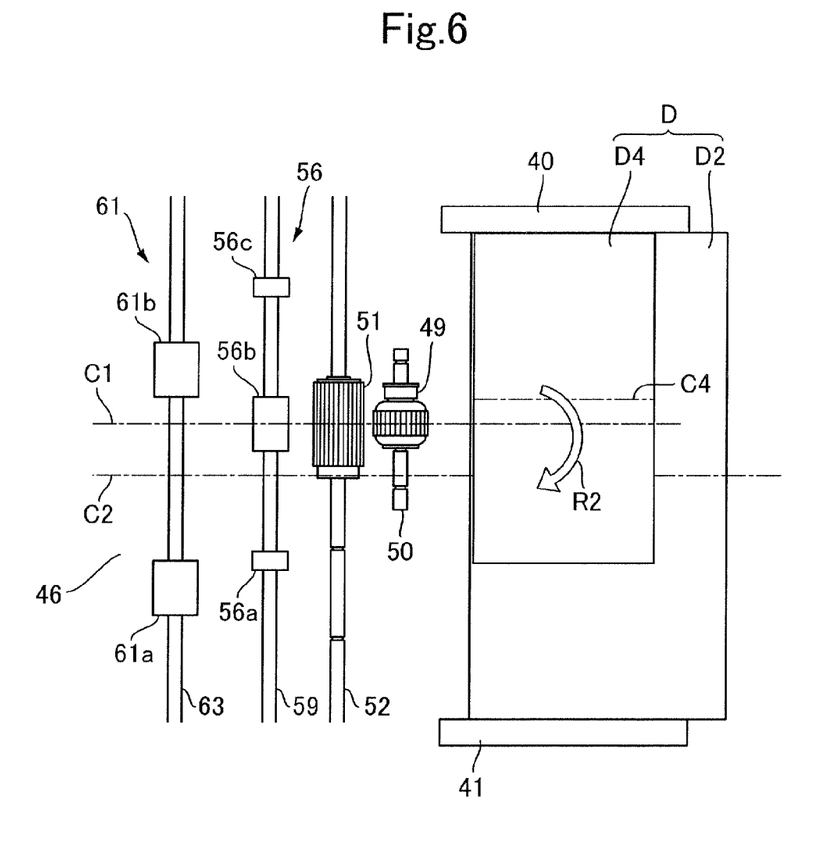
FIG. 6 is a diagram showing an arrangement of the various rollers when a widthwise center of a small sheet among sheets mixedly stacked on the document tray is located on a side of a first restricting plate from the center of conveyance of the pulling roller in the ADF of the first embodiment.

However, when a widthwise center C4 of a stacked document D4 is located on the side of the first restricting plate 40 from the straight line C1 as shown in FIG. 6, a rotational moment that rotates the document D4 clockwise (as indicated by an arrow R2) is generated in feeding and separating the document D4. When such moment is generated in the document D4, the document D4 rotates clockwise and is fed askew because the other end of the document D4 is in a free-end condition, even though one end thereof is restricted by the first restricting plate 40. However, because the centers of conveyance of the pulling roller 56, the separating and conveying roller 51, and the document supplying roller 49 are located at the position offset to the side of the first restricting plate 40 from the widthwise center of the document tray, the rotational moment generated in the document D4 is not large as compared to a case when the centers of conveyance of the pulling roller 56, the separating and conveying roller 51, and the document supplying roller 49 are located on the straight line C2 for example.

Then, the document D1 (D3, D4) conveyed by the pulling roller pair 55 is conveyed to the registration roller pair 60 such that the downstream end of the document D1 abuts against the nip formed by the halted registration roller 61 and the registration driven roller 62. It is noted that because the positions of the centers of conveyance of the separating and conveying roller 51 and the pulling roller 56 are aligned as described above, no rotational moment is generated in the document D1 in passing from the separating and conveying roller 51 to the pulling roller 56.

Figure 7:
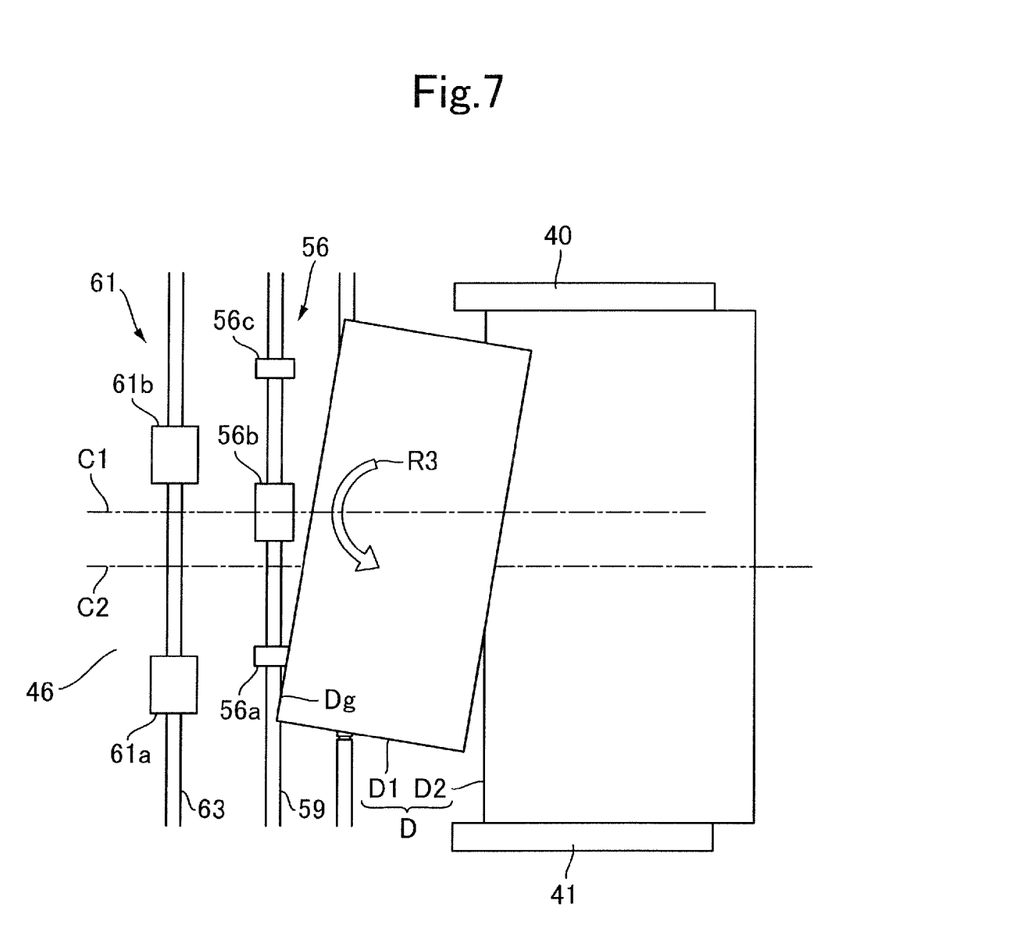
FIG. 7 is a diagram showing a condition in which a small sheet among sheets mixedly stacked on the document tray of the ADF of the first embodiment is fed askew clockwise.

In a case when the document D1 is conveyed askew to the registration roller pair 60 as described above, the registration roller pair 60 corrects the skew of the document D1. Specifically, as shown in FIG. 7, the roller member 56a of the pulling roller 56 abuts a preceding downstream edge Dg of the document D1 against the nip formed by the roller member 61a of the halted registration roller 61 and the registration driven roller 62. Then, even after when the downstream edge of the document D1 abuts against the registration roller pair 60, the document D1 is pushed into the registration roller pair 60 by the rotation of the pulling roller 56. Then, the document D1 forms a loop (deflection) by being pushed by the pulling roller 56, and along with the formation of the loop, a rotational moment that rotates the document D1 counterclockwise (as indicated by an arrow R3 in FIG. 7) is generated in the document D1. It is noted that although a mode in which the rotation of the registration roller 61 is halted when the downstream edge of the document D1 abuts against the registration roller 61 to correct the skew has been illustrated above, it is also possible to adopt a configuration of rotating the registration roller 61 in a direction opposite from the direction of conveying the document to the reading position when the downstream edge of the document D1 abuts to correct the skew.

It is noted that the center of conveyance of the pulling roller 56 is positioned by being offset to the side of the first restricting plate 40 from the center of the sheet conveying path 46 and the center of conveyance of the registration roller 61. Due to that, a distance between the preceding downstream edge Dg of the document D1 to be conveyed to the roller member 61a by the roller member 56a and the center of conveyance of the pulling roller 56 is widened, and a large rotational moment is generated when the document D1 is pushed into the registration roller pair by the pulling roller 56. Then, the document D1 rotates counterclockwise by this moment and its skew is corrected.

After correcting the skew, the document D1 is conveyed to the first read roller pair 67 by the registration roller 61. The document D1 conveyed to the first read roller pair 67 is nipped by the first read roller 65 and the first read driven roller 66, and is conveyed by the first read roller 65 to the second read roller pair 72 by passing through a gap between the first platen glass 29 and the upstream platen roller 69.

At the time when the document D1 passes through on the first platen glass 29, the surface of the document D1 reflects the light irradiated from the lamp 33 provided in the optical bench 32. The reflection light is led to the lens 35 by the mirror 36 and is condensed by the lens 35 on the CCD 37. The CCD 37 photoelectrically converts the reflection light reflecting document information to electrical image signals. The sheet driven by the registration roller 61 is thus conveyed to the image reading position.

The document D1 conveyed to the second read roller pair 72 is then conveyed to the discharge roller pair 79 by the second read roller 70 such that the document D1 passes through the gap between the second platen glass 73 and the downstream platen roller 75. The back surface of the surface of the document D1 read in passing on the first platen glass 29 is read by the back surface reading unit 80 in passing through on the second platen glass 73. Then, the document D1 is discharged by the discharge roller pair 79 onto the discharge tray 47.

The image information of the document D1 read as described above is accumulated as data in a memory and is output to the image forming portion 5. Then, based on the image signals, the image forming portion 5 forms an image on the sheet P fed from the sheet feeding cassette 23.

The pulling roller 56 is disposed such that the center of conveyance thereof is located on the side of the first restricting plate 40 from the widthwise center of the sheet conveying path 46 as described above. With this arrangement, when the widthwise center of the document D1 stacked on the document tray 39 is aligned with the center of conveyance of the pulling roller 56, it is possible to convey the document D1 without skew. When the widthwise center C3 of the document D3 is located on the side of the second restricting plate 41 from the center of conveyance of the pulling roller 56, it is possible to feed the document D3 without skew by restricting one widthwise end of the document D3 by the first restricting plate 40. When the widthwise center C4 of the document D4 is located on the side of the first restricting plate 40 from the center of conveyance of the pulling roller 56, it is possible to suppress a degree of skew even if the document D4 skews by reducing the rotational moment when the document D4 is conveyed askew.

The document D1 generates the large rotational moment that rotates the document D1 counterclockwise when the document D1 skewed clockwise abuts against and is pushed into the registration roller 61 by the pulling roller 56, so that it is possible to reliably correct the skew of the document D1. Thereby, it is possible to convey the document D1 to the reader portion 31 without skew and to prevent the image of the document D1 from being read aslant.

It is also possible to suppress the skew of the document D without changing the position of the center of conveyance of the pulling roller 56 and to correct the skew even if the document D skews. Accordingly, it is possible to prevent all of the sheets from skewing in skimming through in the different-width sheet mixed-stacking mode. Thus, it is not only possible to simplify the control of the conveyance of the document D but also to prevent the skew from being caused in conveying the document D to the reader portion 31.

The separating and conveying roller 51 is also disposed such that the center of conveyance thereof is located on the side of the first restricting plate 40 from the widthwise center of the sheet conveying path 46, similarly to the pulling roller 56. With this arrangement, it is possible to separate and convey the documents D one by one without skew when the widthwise center of the document D1 stacked on the document tray 39 is aligned with the center of conveyance of the separating and conveying roller 51. Still further, when the widthwise center C3 of the document D3 is located on the side of the second restricting plate 41 from the center of conveyance of the separating and conveying roller 51, it is possible to separate and convey the document D3 without skew by restricting one widthwise end of the document D3 by the first restricting plate 40. When the widthwise center C4 of the document D4 is located on the side of the first restricting plate 40 from the center of conveyance of the separating and conveying roller 51, it is possible to suppress the degree of skew, even if the document D4 skews, by reducing the rotational moment when the document D4 is conveyed askew.

No rotational moment is generated in the document D in passing the document D from the separating and conveying roller 51 to the pulling roller 56, so that the pulling roller 56 can receive the document D from the separating and conveying roller 51 and to convey to the registration roller 61 without skew.

It is noted that the document D is conveyed while rotating counterclockwise in separating and conveying the document D when the centers of conveyance of the separating and conveying roller 51 and the pulling roller 56 are located on the side of the first restricting plate 40 from the widthwise center of the document D whose width is narrow as described above. Then, if the centers of conveyance of the separating and conveying roller 51 and the pulling roller 56 are located to the side of the first restricting plate 40 excessively, there is a possibility that the document D deflects without withstanding a restricting force (indicated by an arrow F in FIG. 5) of the first restricting plate 40 and it becomes difficult to restrict the document D by the first restricting plate 40, depending on firmness (rigidity) of the document D. Then, as a result, there is a possibility that the document D is conveyed askew while being rotated considerably.

Accordingly, it is preferable to align the centers of conveyance of the separating and conveying roller 51 and the pulling roller 56 substantially with the widthwise center of the document D having a small width. For example, in designing the image reading apparatus 3 by assuming a case of skimming through in the different-width sheet mixed-stacking mode by stacking a large-size document D of A3 (A4) sheet having a widthwise length of 297 mm and a small-size document D of B4 (B5) sheet having a widthwise length of 257 mm on the document tray 39, it is preferable to shift the centers of conveyance of the separating and conveying roller 51 and the pulling roller 56 from the widthwise center of the large-size document D to the widthwise center of the small-size document D by 20 mm obtained from $(297-257)/2=20$.

In the same manner, in designing the image reading apparatus 3 by assuming a case of skimming through in the different-width sheet mixed-stacking mode by stacking a large-size document D of B4 (B5) sheet having a widthwise length of 257 mm and a small-size document D of A4 sheet having a widthwise length of 210 mm on the document tray 39, it is preferable to shift the centers of conveyance of the separating and conveying roller 51 and the pulling roller 56 from the widthwise center of the large-size document D to the widthwise center of the small-size document D by 23.5 mm obtained from (257−210)/2=23.5.

Second Embodiment

Figure 8:
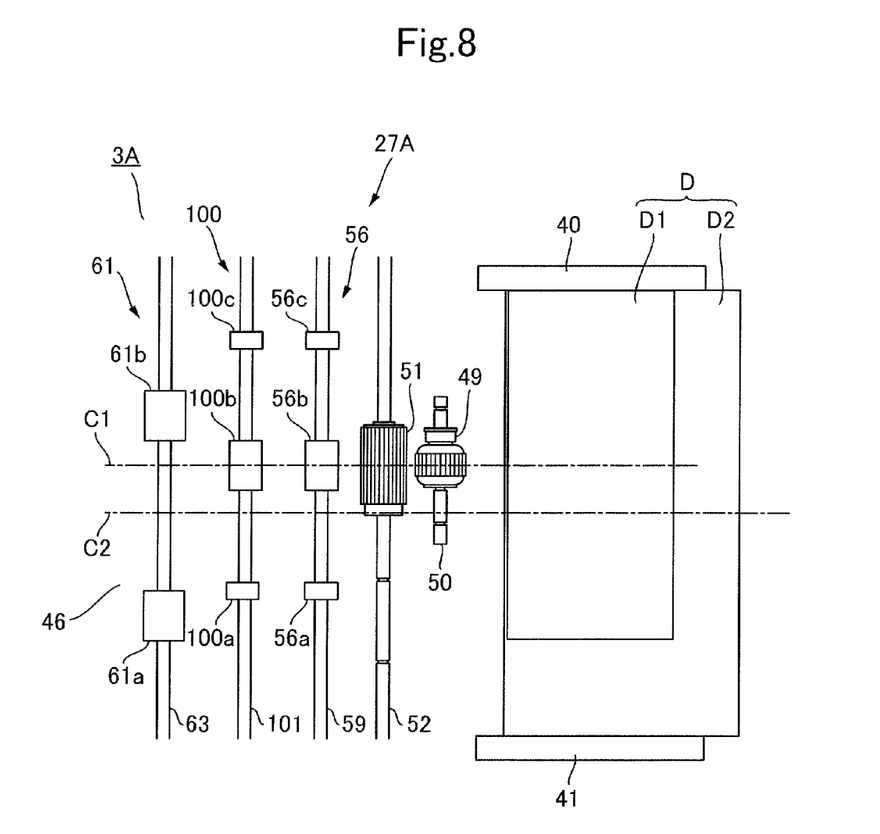
FIG. 8 is a diagram showing another arrangement of various rollers of the ADF of a second embodiment of the invention.

Next, an image reading apparatus 3A of a second embodiment of the invention will be descried with reference to FIG. 8. It is noted that the image reading apparatus 3A of the second embodiment will be described here in terms of differences from the image reading apparatus 3 described above, and the same or corresponding parts of the image reading apparatus 3A with those of the image reading apparatus 3 will be denoted by the same reference numerals and an explanation thereof will be omitted here.

An ADF 27A of the image reading apparatus 3A is provided with a push-in roller pair configured to convey the document D1 pulled out of the separating and conveying roller 51 by the pulling roller 56 to the registration roller pair 60. As shown in FIG. 8, the push-in roller pair includes a push-in roller 100 and a push-in driven roller not shown. Similarly to the pulling roller 56, the push-in roller 100 includes three large and small roller members 100*a*, 100*b* and 100*c*, i.e., the conveying rotating bodies, supported together by a rotational shaft 101 while orienting in the same sheet feeding direction. The identical small roller members 100*a* and 100*c* are arranged on both sides of the large roller member 100*b* at equal intervals.

A center of conveyance of the push-in roller 100 is a widthwise center (midpoint) of the large roller member 100*b*. Similarly to the document supplying roller 49, the separating and conveying roller 51, and the pulling roller 56, the center of conveyance of the push-in roller 100 is located on the straight line C1 shown in FIG. 8, and is positioned on the side of the first restricting plate 40 from the straight line C2 or from the widthwise center of the document tray 39. A sheet conveying portion is composed of the push-in roller pair and the pulling roller pair 55. It is noted that the roller member (third push-in roller member) 100*a* disposed orthogonally on the side of the second restricting plate 41 from the center roller member (first push-in roller member) 100*b* among the roller members 100*a*, 100*b* and 100*c* of the push-in roller 100 is disposed orthogonally on the side of the first restricting plate 40 from the roller member 61*a* of the registration roller 61.

Document feeding operations of the image reading apparatus 3A constructed as described above will now be explained. The pulling roller 56 conveys the document D1 separated by the separating and conveying roller 51 and the separating pad 53 to the push-in roller pair. Then, the push-in roller 100 conveys the document D1 from the pulling roller 56 such that a downstream-side end of the document D1 abuts against the nip of the registration roller pair 60. Even after abutting against the nip of the registration roller pair 60, the push-in roller 100 conveys the document D1 so as to push into the registration roller pair 60 and corrects a skew of the document D1 by forming a loop in the document D1.

The skew is corrected by abutting the skewed document D1 against the registration roller pair 60 by the push-in roller 100 as described above. This arrangement also makes it possible to suppress a degree of skew of the small document D and to reliably correct the skew of the document D in the same manner with the image reading apparatus 3 of the first embodiment. It is also possible to simplify the controls and to prevent the document D from skewing in conveying to the reader portion 31.

It is noted that although the registration portion for correcting the skew of the document D is constructed by the registration roller pair 60 in the embodiments described above, the registration portion is not limited to such configuration. For instance, the registration portion may be constructed by a registration shutter, and may be any member as long as it can convey the document D after receiving the document D conveyed from the pulling roller 56 once.

While the cases of skimming through the two kinds of documents D having the large and small sheet widths in the different-width sheet mixed-stacking mode have been described in each embodiment described above, the present invention is not limited to such cases and is applicable also to a case of skimming through three or more different kinds of documents D having different sheet widths in the different-width sheet mixed-stacking mode. Still further, although the CCD image sensor 37 has been used as the image sensor in the embodiments described above, another sensor such as a CMOS image sensor may be used. When the CMOS image sensor is used, the reader portion 31 is constructed as a CIS (contact image sensor) scanner. Although the conveying roller that conveys the sheet such that the sheet abuts against the registration roller 61 in the halt condition is configured by the pulling roller 56 in the embodiments described above, the document supplying roller 49 and the separating and conveying roller 51 may be used as conveying rollers without providing the pulling rollers and the push-in rollers for example in a case of a compact image reading apparatus that can be installed on a desktop.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-124456, filed on May 31, 2012, which is hereby incorporated by reference herein in its entirety.

What is claimed is:

1. An image reading apparatus, comprising:
   an image reading portion configured to read an image formed on a sheet;
   a stacking portion configured to stack the sheet from which the image is to be read by the image reading portion;
   a first restricting portion disposed in the stacking portion and configured to restrict a first end in a widthwise direction orthogonal to a sheet feeding direction of all sheets having different sizes and mixedly stacked on the stacking portion;
   a second restricting portion disposed to face the first restricting portion and configured to restrict a second end in the widthwise direction of a sheet having a widest width among the sheets mixedly stacked on the stacking portion;
   a separating and feeding portion configured to feed the sheets stacked on the stacking portion one by one to a sheet conveying path;
   a skew correcting portion provided on a downstream of the separating and feeding portion in the sheet feeding direction and configured such that a downstream end in the sheet feeding direction of the sheet abuts to correct a skew of the sheet, and to feed the sheet whose skew has been corrected to the image reading portion; and
   a sheet conveying portion provided upstream of the skew correcting portion in the sheet feeding direction and configured to convey the sheet such that the downstream end of the sheet abuts against the skew correcting portion, the sheet conveying portion being disposed such that a center of conveyance of the sheet conveying portion is located on a side of the first restricting portion from a widthwise center of the sheet conveying path.

2. The image reading apparatus according to claim 1, wherein the separating and feeding portion has a sheet supplying roller, and a center of conveyance of the separating and feeding portion is located on the side of the first restricting portion from the widthwise center of the sheet conveying path.

3. The image reading apparatus according to claim 2, wherein the center of conveyance of the separating and feeding portion is aligned with the center of conveyance of the sheet conveying portion in the sheet feeding direction.

4. The image reading apparatus according to claim 1, wherein the skew correcting portion has a skew correcting roller, and a center of conveyance of the skew correcting portion is aligned with the widthwise center of the sheet conveying path in the sheet feeding direction.

5. The image reading apparatus according to claim 2, wherein the skew correcting portion has a skew correcting roller, and a center of conveyance of the skew correcting portion is aligned with the widthwise center of the sheet conveying path in the sheet feeding direction.

6. The image reading apparatus according to claim 3, wherein the skew correcting portion has a skew correcting roller, and a center of conveyance of the skew correcting portion is aligned with the widthwise center of the sheet conveying path in the sheet feeding direction.

7. The image reading apparatus according to claim 1, wherein the widthwise center of the sheet conveying path is located at a midpoint position between the first and second restricting portions, and
the first and second restricting portions move widthwise while keeping the condition in which a distance from the first restricting portion to the widthwise center of the sheet conveying path is equal to a distance from the second restricting portion to the widthwise center of the sheet conveying path.

8. An image reading apparatus comprising:
a sheet tray configured to stack sheets;
a first restricting plate configured to restrict a first end in a direction orthogonal to a sheet feeding direction of all sheets having different sizes and mixedly stacked on the sheet tray;
a second restricting plate configured to restrict a second end on an opposite side from the first end of a sheet having a widest width among the sheets mixedly stacked on the sheet tray;
a skew correcting roller configured such that a downstream end in the sheet feeding direction of the sheet fed from the sheet tray to the sheet conveying path abuts, and to rotate to feed the sheet to an image reading position; and
a conveying roller located on an upstream of the skew correcting roller in the sheet feeding direction to convey the sheet such that the sheet abuts against the skew correcting roller, the conveying roller being disposed such that a center of conveyance of the conveying roller is located on the side of the first restricting plate widthwise from a center of conveyance of the skew correcting roller.

9. The image reading apparatus according to claim 8, wherein the center of conveyance of the skew correcting roller is aligned with the widthwise center of the sheet conveying path in the sheet feeding direction.

10. The image reading apparatus according to claim 9, further comprising a sheet supplying roller located on an upstream of the conveying roller in the sheet feeding direction to supply the sheet stacked on the sheet tray to the sheet conveying path;
wherein a center of conveyance of the sheet supplying roller is located on the side of the first restricting plate from the widthwise center of the sheet conveying path.

11. The image reading apparatus according to claim 10, wherein the center of conveyance of the sheet supplying roller is aligned with the center of conveyance of the conveying roller in the sheet feeding direction.

12. The image reading apparatus according to claim 11, further comprising a separating and conveying roller located on a downstream of the sheet supplying roller in the sheet feeding direction and on an upstream of the conveying roller in the sheet feeding direction to separate and convey the sheet conveyed from the sheet supplying roller;
wherein a center of conveyance of the separating and feeding roller is aligned with the center of conveyance of the sheet supplying roller in the sheet feeding direction.

13. The image reading apparatus according to claim 12, further comprising a push-in roller disposed on a downstream of the conveying roller in the sheet feeding direction and on an upstream of the skew correcting roller in the sheet feeding direction, and conveying the sheet conveyed from the conveying roller such that the downstream end in the sheet feeding direction of the sheet abuts against the skew correcting roller;
wherein a center of conveyance of the push-in roller is aligned with the center of conveyance of the conveying roller in the sheet feeding direction.

14. The image reading apparatus according to claim 13, wherein the conveying roller includes:
a first conveying roller member;
a second conveying roller member arrayed widthwise with the first conveying roller member such that the both roller members orient in the sheet feeding direction, and disposed widthwise on the side of the first restricting plate from the first conveying roller member; and
a third conveying roller member arrayed widthwise with the first conveying roller member such that the both roller members orient in the sheet feeding direction, and is disposed widthwise on the side of the second restricting plate from the first conveying roller member;
wherein the center of conveyance of the conveying roller including the first through third conveying roller members is located on the side of the first restricting plate from the widthwise center of the sheet conveying path.

15. The image reading apparatus according to claim 14, wherein the skew correcting roller includes:
a first roller member; and
a second roller member arrayed widthwise with the first roller member such that the both roller members orient in the sheet feeding direction, and disposed widthwise on the side of the second restricting plate from the first roller member; and
wherein the center of conveyance of the skew correcting roller including the first and second roller members is aligned with the widthwise center of the sheet conveying path.

16. The image reading apparatus according to claim 15, wherein the third conveying roller member of the conveying roller is disposed widthwise on the side of the first restricting plate from the second roller member of the skew correcting roller.

17. The image reading apparatus according to claim 8, wherein the widthwise center of the sheet conveying path is located at a midpoint position between the first and second restricting plates, and the first and second restricting plates move widthwise while keeping the condition in which a distance from the first restricting plate to the widthwise center of the sheet conveying path is equal to a distance from the second restricting plate to the widthwise center of the sheet conveying path.

18. An image forming apparatus comprising:
an image reading apparatus of claim 1, and
an image forming portion configured to form an image based on image information read by the image reading apparatus.

19. An image forming apparatus comprising:
a sheet tray on which sheets to be fed are stacked;
a first restricting plate that restricts a first end in a widthwise direction orthogonal to a sheet feeding direction of the sheets stacked on the sheet tray;
a second restricting plate configured to restrict a second end on an opposite side from the first end of at least one of the sheets stacked on the sheet tray, the second restricting plate moving widthwise with the first restricting plate while keeping the condition in which a distance from the first restricting plate to a midpoint position is equal to a distance from the second restricting plate to the midpoint position;
a skew correcting roller configured such that a downstream end in the sheet feeding direction of the sheet fed from the sheet tray abuts, and to rotate to convey the sheet;
an image reading portion configured to read an image of the sheet whose skew has been corrected by the skew correcting roller; and
a conveying portion provided upstream of the skew correcting roller in the sheet feeding direction and configured to convey the sheet such that the downstream end in the sheet feeding direction of the sheet abuts against the skew correcting roller, the conveying portion being disposed such that a center of conveyance of the conveying portion is offset widthwise on aside of the first restriction plate from the midpoint position.

* * * * *